(12) United States Patent
Merullo et al.

(10) Patent No.: US 10,554,810 B1
(45) Date of Patent: Feb. 4, 2020

(54) SYSTEM AND METHOD FOR ROUTING AND ADMINISTERING TTY CALLS

(71) Applicant: JPMorgan Chase Bank, N.A., New York, NY (US)

(72) Inventors: Michael J. Merullo, Columbus, OH (US); Leepika Dhillon, Bear, DE (US); Richard H Hogrogian, Cherry Hill, NJ (US); Ivie Okor, Fort Lauderdale, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/288,021

(22) Filed: Oct. 7, 2016

(51) Int. Cl.
*H04M 3/42* (2006.01)
*H04M 3/51* (2006.01)
*H04M 3/22* (2006.01)

(52) U.S. Cl.
CPC ..... *H04M 3/42391* (2013.01); *H04M 3/2254* (2013.01); *H04M 3/5133* (2013.01); *H04M 3/5175* (2013.01); *H04M 3/5183* (2013.01); *H04M 2203/551* (2013.01); *H04M 2203/556* (2013.01); *H04M 2203/558* (2013.01)

(58) Field of Classification Search
None
See application file for complete search history.

(56) References Cited

U.S. PATENT DOCUMENTS

| 6,707,904 | B1 * | 3/2004 | Judkins | H04M 3/51 379/265.06 |
| 7,567,653 | B1 * | 7/2009 | Michaelis | H04M 3/42391 370/270 |
| 8,705,707 | B1 * | 4/2014 | Schilit | H04M 1/274583 379/201.07 |
| 2002/0021791 | A1 * | 2/2002 | Heilmann | H04L 63/105 379/189 |
| 2005/0129212 | A1 * | 6/2005 | Parker | H04M 3/51 379/265.03 |
| 2006/0002536 | A1 * | 1/2006 | Ambrose | H04M 1/56 379/201.01 |
| 2006/0062376 | A1 * | 3/2006 | Pickford | H04M 3/5183 379/265.12 |

OTHER PUBLICATIONS

"NextTalk 4.0—User's Guide;" NXi Communications, Inc., Feb. 25, 2003.

* cited by examiner

*Primary Examiner* — Maria El-Zoobi
(74) *Attorney, Agent, or Firm* — Greenblum & Bernstein, P.L.C.

(57) ABSTRACT

Embodiments of the invention are related generally to systems and methods for routing and administering TTY calls on behalf of individuals who may be deaf and/or hearing-impaired and/or speech-impaired. The invention provides for systems and methods which are operable to both streamline the routing of non-TTY calls, which are often mistakenly made to TTY phone numbers, as well as to better administer TTY calls to true TTY callers. In the present invention, TTY calls are routed to an operator, who may be presented with a real-time feed of TTY calls received by themselves and/or by other operators. Further, search functionality and exportation of data from the system provide additional functionality for users. In embodiments of the invention, data associated with this system may be used to allow for more effective management of a TTY system by users and/or system administrators.

19 Claims, 6 Drawing Sheets

SYSTEM AND METHOD FOR ROUTING AND ADMINISTERING TTY CALLS

TECHNICAL FIELD

Embodiments of the invention are related generally to systems and methods for routing and administering TTY calls on behalf of individuals who may be deaf and/or hearing-impaired and/or speech-impaired.

BACKGROUND OF THE INVENTION

TTY ("TeleTYpewriter")—also known as TDD ("Telephone Device for the Deaf") or TT ("Text Telephone")—devices and services were developed in the 1960's as a way to allow individuals who were deaf and/or hearing-impaired and/or speech-impaired to use the increasingly ubiquitous telephone. Traditionally, these devices enabled users to type and read to communicate over the phone, sending and receiving typed messages from point-to-point and point-to-multipoint over various types of communications channels. Different types of TTY devices were capable of utilizing a variety of different communication media. Eventually, in the later part of the twentieth century, much smaller and compact (often handheld) versions of the TTY were manufactured and made available to users.

Eventually, in order to facilitate communication between hearing/speech-enabled users with telephones, and hearing/speech-impaired TTY users, TTY relay services were offered. In a TTY relay service, a communication assistant would convert voice-to-text and text-to-voice communication between parties, displaying the text on the user's TTY. In its modern form, this type of service—often referred to as Telecommunications Relay Services ("TRS")—is mandated by the Federal Communications Commission ("FCC"), which requires all telephone companies that operate private branch exchanges (a private telephone system within an organization) to implement three-digit 711 dialing for access to TRS.

Other solutions exist for deaf and/or hearing/speech-impaired individuals seeking to use the telephone, sometimes in combination with a TTY device, such as, for example, Voice Carry Over ("VCO") systems, Hearing Carry Over ("HCO") systems, and Speech-to-Speech ("STS") relay services. In a Captioned Telephone Service ("CTS"), individuals with a special "captioned telephone" may communicate by speaking, listening (to the extent they are able), and reading what the other person is saying through captions displayed on the device. Also available are Video Relay Services ("VRS"), Internet-based systems for individuals with video conferencing equipment or videophones who communicate in American Sign Language.

In the context of a corporate call center, or any centralized office that receives or transmits a large volume of requests by telephone, TTY devices have historically caused efficiency problems for call operators. Typically, a call operator receiving a call from a TTY device would be required to physically retrieve a TTY device located somewhere at the call center before the call could be accepted. These difficulties led to the recent advent of software-based solutions for accepting calls from deaf and/or hearing/speech-impaired customers, offered by companies such as NexTalk®. These solutions allow a call operator, when receiving a TTY call, to immediately recognize the incoming call as a TTY call and open a dialogue screen which enables the parties to communicate. These solutions have dramatically improved efficiency because no dedicated TTY machine needed, so the need for call operators to physically obtain a TTY device from a limited number of similar devices shared by all the members of a call center is eliminated.

A financial institution may often provide the TTY number for deaf and/or hearing/speech-impaired customers on the back of a credit, debit, or other financial card associated with the institution. Similarly, customers searching for customer service numbers on a financial institution's website may find the TTY and non-TTY phone numbers in close proximity with one another. This can also present problems, however, where hearing/speech-enabled customers mistakenly call the TTY number. For a large financial institution receiving a high volume of daily calls, these customer mistakes may be sufficiently frequent to cause efficiency problems for call operators as well as for the call centers. Accordingly, solutions are needed which address the difficulties in routing and distinguishing between TTY and non-TTY calls.

Still further, because of the recent developments in the TTY field, there does not currently exist any solution for businesses to automate the classification types of TTY calls received. Currently, software-based call management solutions are communication interfaces, and do not offer any type of informatics functionality. Ideally, such data could be made available to users over the system in real time. This would be optimal to the goal of improving the TTY call process itself (e.g., mistaken calls from hearing/speech enabled customers). Further, the ability to automatically classify incoming TTY calls by, e.g., Line of Business ("LOB") would also serve a business objective for large companies, particularly financial institutions. Accordingly, solutions are needed which allow for improving the efficiency of this process.

BRIEF SUMMARY OF THE INVENTION

In accordance with exemplary embodiments of the present invention, there is provided a computer-implemented system for routing and managing TTY calls. The system comprises storing instructions in at least one storage medium coupled to at least one computer processor configured to access the stored instructions to: record receipt of a telephone call to a TTY phone number in a database, determine that the telephone call to the TTY phone number is a TTY call made from a TTY device, route the TTY call to a TTY operator, wherein the TTY operator is associated with an operator user device, generate a real-time feed of the TTY call on the operator user device, and present the real-time feed on a user interface associated with the operator user device, the real-time feed further comprising data associated with at least one other TTY call.

In an additional aspect, the invention includes a computer-implemented method for routing and managing TTY calls. The method comprises storing instructions in a computer memory coupled to at least one computer processor, receiving a telephone call to a TTY phone number, determining that the telephone call to the TTY phone number is a TTY call made from a TTY device, routing the TTY call to a TTY operator, wherein the TTY operator is associated with an operator user device, accessing the stored instructions by the at least one computer processor, executing the stored instructions to generate a real-time feed of the TTY call on the operator user device, and presenting the real-time feed on a user interface associated with the operator user device, the real-time feed comprising data associated with at least one other TTY call.

In a further aspect of the invention, a system is provided for routing and managing TTY calls. The system comprises storing instructions in at least one storage medium coupled to at least one computer processor configured to access the stored instructions to: record receipt of a telephone call to a TTY phone number in a database, determine that the telephone call to the TTY phone number is a TTY call made from a TTY device, route the TTY call to a TTY operator, wherein the TTY operator is associated with an operator user device; generate a real-time feed of the TTY call on the operator user device, assign an event code and corresponding event name to at least one event on the call, display the event code and corresponding event name on the real time feed, wherein the event code and corresponding event name are associated with a specific date and time, and present the real-time feed on a user interface associated with the operator user device.

BRIEF DESCRIPTION OF THE DRAWINGS

The present invention is described in detail below with reference to the attached drawings figures, wherein.

DETAILED DESCRIPTION OF PREFERRED EMBODIMENTS

Figure 1:
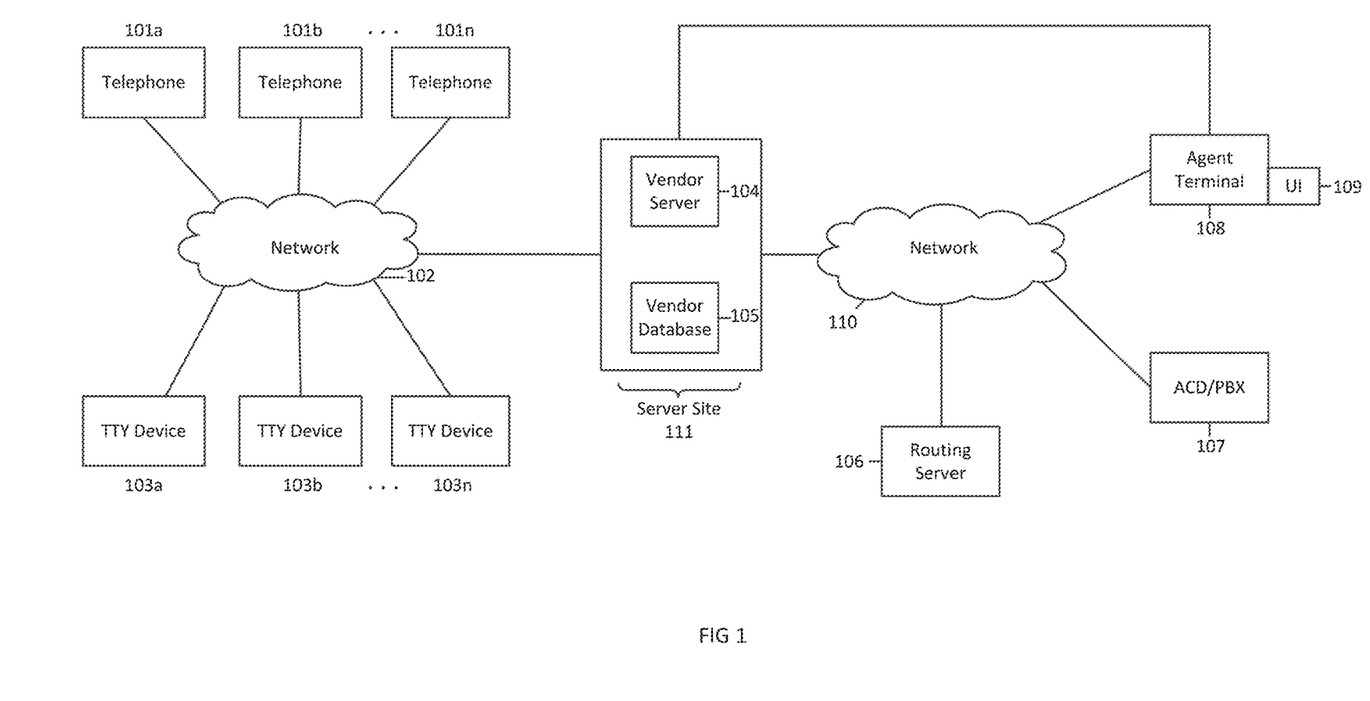
FIG. 1 is a diagram illustrating an exemplary system architecture of the call flow associated with a TTY call, in accordance with an embodiment of the invention.

Embodiments of the present invention are related to systems and methods for routing and administering TTY calls on behalf of individuals who may be deaf and/or hearing-impaired and/or speech-impaired. To this end, FIG. 1 illustrates an exemplary system architecture of the call flow associated with a TTY call.

The infrastructure of such a system may include telephones 101a, 101b . . . 101n connected over network 102. Network 102 may be a traditional public switched telephone network ("PTSN"). TTY devices 103a, 103b . . . 103n may also be connected over network 102. In embodiments of the invention, a call may be initiated from TTY device 103a, which is routed to vendor server 104. Vendor server 104 may be a single server or multiple servers which perform a variety of functions. For example, in embodiments of the invention, vendor server 104 may actually comprise two servers, a vendor telephone server and a vendor monitoring server. Incoming calls may then answered by a system script validating that the caller is using a TTY device via the vendor telephone server. The vendor monitoring server may assist in routing true TTY calls and/or informing the caller that their call is being routed to the next available agent. In embodiments of the invention, vendor database 105 is also coupled to vendor server 104.

In embodiments of the invention, the system may also provide for the redirection of a call mistakenly made to the TTY number by a hearing enabled customer. For instance, vendor server may play an automated audio message requesting that the customer take a specific action (e.g., push a button on the telephone). A hearing-enabled customer will hear the message and push the button, which will cause the call to be redirected through the non-TTY system (using, e.g., using vendor telephone server, as described herein). Customers that are not hearing-enabled will not hear the message and will stay on the line until they can be informed that their call is being routed to the next available agent.

Those skilled in the art will further appreciate that vendor server 104 and/or vendor database 105 may be hosted on server site 111. In embodiments of the invention, server site 111 may comprise multiple server sites depending on the configuration of vendor server 104 and/or vendor database 105, or any other logistical factor that would make such an arrangement favorable.

Embodiments of the invention may further comprise routing server 106. Routing server 106 may comprise a pre-routed number for distribution of the TTY call via network 110, and may further assist in the placement of a traditional "voice" call to the pre-routed number for distribution of the TTY call. This allows for a place to be held in the queue for the TTY call. Network 110 is preferably the Internet, but may be, or include, other types of networks. Furthermore, even though only one network is shown, multiple networks may be used. Network 110 may include a wired or wireless local area network ("LAN") and a wide area network ("WAN"), wireless personal area network ("PAN"), and other types of networks. Additionally or alternatively, computers or terminals may be connected over an Intranet, Extranet, Ethernet, or any other system that provides communications. Furthermore, components of the system may communicate through a combination of wired or wireless paths.

In embodiments of the invention, the routing server may also be coupled with an automatic call distributor ("ACD") and/or private branch exchange ("PBX") 107. ACD/PBX 107 may an distribute incoming TTY calls to a specific group of terminals or agents, such as agent terminal 108, based on, for example, a customer's use of the TTY phone number to dial the call. In embodiments of the invention, other criteria may be used to direct the calls to a particular agent or terminal; for example, where agent terminal 108 is located at a location assigned by LOB, user input regarding the content of the call may be used. Once ACD/PBX 107 routes the call to the appropriate agent terminal 108, an audio file may be played informing the terminal operator that a TTY call has been received.

Agent terminal 108 may include, for example, mainframe computers, personal computers, desktop or laptop computing systems and the like. Specifically, agent terminal 108 may be capable of running a software-based solutions for accepting calls from deaf and/or hearing/speech-impaired customers (such as, e.g., NexTalk®). Agent terminal 108 may additionally be or include mobile systems, such as smart phones, tablets, or any other portable computing apparatus. Mobile client systems may execute downloadable applications for operating in conjunction with the present infrastructure. The downloadable applications may be stored in memory and executed by processors on the mobile systems and may provide a plurality of user interfaces. Agent terminal 108 may further comprise user interface 109.

User interface 109 may include input devices such as a keyboard and pointing device (often a mouse, trackball, touch pad, etc.). Other input devices may include a microphone, joystick, game pad, satellite dish, scanner, voice recognition device, keyboard, touch screen, capacitive and resistive (multi-touch) touch screens, toggle switch, pushbutton, or the like. These and other input devices are often connected to the processing unit through a user input interface that is coupled to the system bus, but may be connected by other interface and bus structures, such as a parallel port, game port or a universal serial bus ("USB").

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

In embodiments of the invention, the operator at agent terminal 108 may, upon being notified that a TTY call has been received, enter a code. The code may be, for example, an alphanumeric code (such as a password) and/or a Dual Tone Multi Frequency ("DTMF") code. Those skilled in the art will appreciate that the code may also be voice-delivered. The code may then be routed back through vendor server 104. In embodiments of the invention, the code is translated to the agent terminal 108 location on network 110.

Finally, the TTY call is sent and connected to the agent terminal 108. In various embodiments of the invention, agent terminal 108 may leave the "voice" call in place while interacting with the text call. This would allow ACD/PBX 107 to route, track, and record text calls in the same way it does for regular voice calls.

In the context of a large call center, there may be many agents conducting TTY calls with hearing/speech-impaired customers, for instance, as described herein. Those skilled in the art will understand that various embodiments of the present invention described herein may be used additionally or alternatively with FIG. 2, which illustrates an exemplary real-time, or live, feed of TTY call operator, or agent, activity. The live feed log-in display 201 may be displayed on, e.g., an agent terminal user interface 109 as described herein. In embodiments of the invention, live feed log-in display 201 may be viewable by designated users only, and so may or may not be accessible to agent terminal user interface 109. Still further, in various embodiments of the invention, the live feed log-in display 201 may be assigned varying degrees of accessibility within different sectors of a single organization dependent upon, e.g., the particular needs associated with a particular LOB.

Figure 2:
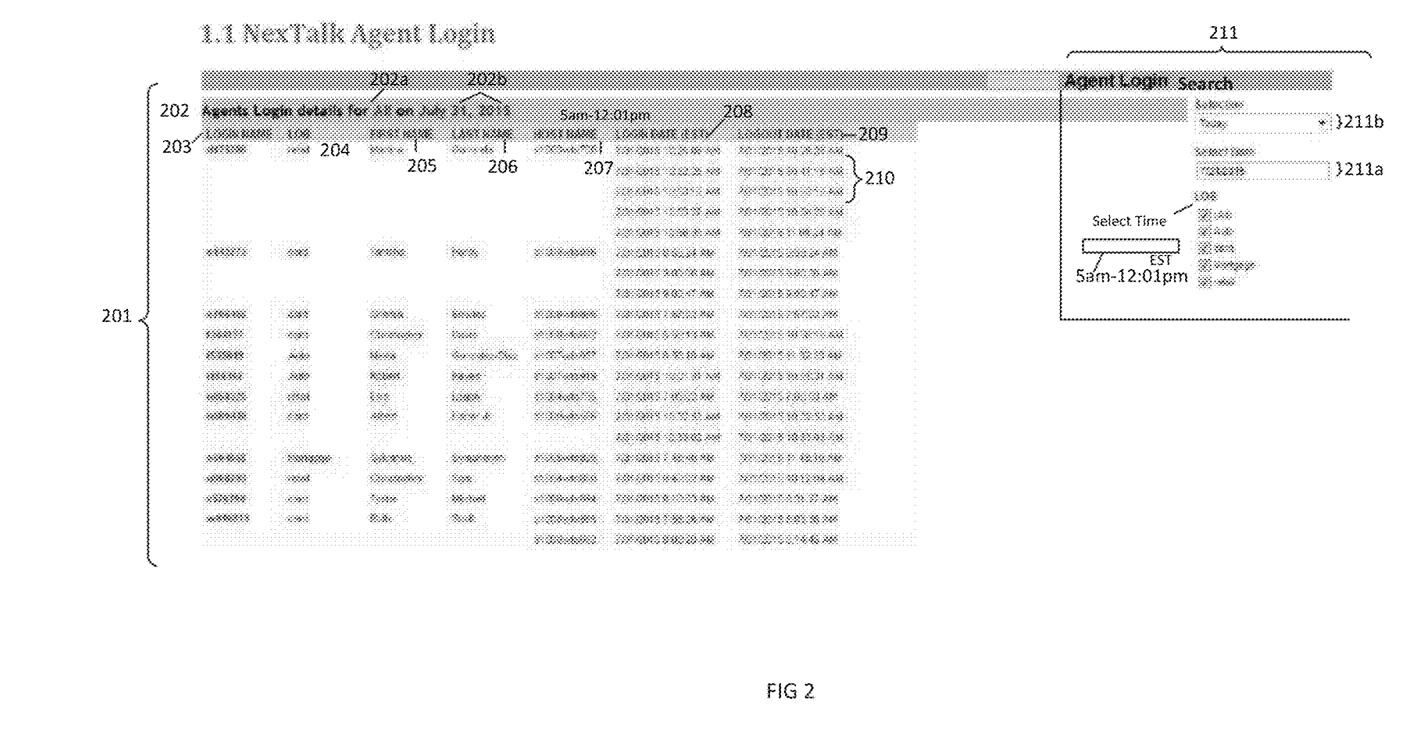
FIG. 2 is a diagram of an exemplary display of a real-time feed of TTY agent activity, in accordance with an embodiment of the invention.

In embodiments of the invention, live feed log-in display 201 may display user login information within a user-designated subcategory 202a for a designated date and/or time 202b, the user designated subcategory comprising, e.g., LOGIN NAME 203, LOB 204, FIRST NAME 205, LAST NAME 206, HOST NAME 207, LOGIN DATE 208, and LOGOUT DATE 209. Those skilled in the art will appreciate that these categories are exemplary and may be adjusted based upon the requirements of a particular user and/or business. In an embodiment of the invention, it may be desirable for live feed log-in display 201 to default to a real-time live feed displayed by most recent LOGIN DATE 208. Additionally or alternatively, another default mode may be adjusted by the user.

LOGIN NAME 203 may comprise an assigned login name for an agent at a call center. In embodiments of the invention, the agent may choose or designate LOGIN NAME 203. Additionally or alternatively, LOGIN NAME 203 may be automatically generated at regular intervals. LOB 204 indicates the Line of Business with which the corresponding agent is associated. Exemplary embodiments with in a financial institution may include, for instance: automobile, card services, mortgage, and retail. Those skilled in the art will further appreciate that symbols, abbreviations, and/or other designations for LOB may be utilized. In embodiments of the invention, the LOB 204 designation may refer to the agent's classification and/or the content of the TTY call and/or both. The FIRST NAME 205, LAST NAME 206, and HOST NAME 207, provide further identification of the agent. HOST NAME 207 may refer to the host/server name that the agent previously logged into.

LOGIN DATE 208 and LOGOUT DATE 209 show the date and time that the corresponding agent logged into the system, within the parameters of user-designated subcategory 202a for designated date and/or time 202b. It may be desirable, particularly for large corporations with call centers in more than one time zone, to standardize the LOGIN DATE 208 and LOGOUT DATE 209 information by, for instance, displaying all time as Eastern Standard Time ("EST"). In embodiments of the invention, an agent may stay logged into the TTY software even when the agent is not actively conducting a TTY call. As such, LOGIN DATE 208 and LOGOUT DATE 209 may refer to the entire time that an agent has been available for TTY calls (total time). In an embodiment of the invention, an agent may only be logged into the TTY software when the agent is actively conducting a TTY call (active time). Under these circumstances, LOGIN DATE 208 and LOGOUT DATE 209 would refer only to the time that an agent has spent on TTY calls with a customer. Accordingly, a single agent who has conducted more than one TTY call within designated date and/or time 202b would show multiple entries under LOGIN DATE 208 and LOGOUT DATE 209 as shown at 210. Those skilled in the art will appreciate that embodiments of the invention may include data for both total time and/or active time.

Live feed log-in display 201 may further comprise agent login search display 211. Those skilled in the art will appreciate that agent login search display 211 may appear simultaneously with live feed log-in display 201. Additionally or alternatively, agent login search display 211 may appear on a separate display and/or a pop-up window. In embodiments of the invention, the user may select a Search option from a drop-down menu on the display. Agent login search 211 allows a user to access all agent login entries and separate them out according to, e.g., a search-designated subcategory 211a and/or a search-designated date and/or time 211b. In an exemplary embodiment of the invention, search-designated subcategory 211a allows the user to view entries on live feed log-in display 201 for calls and/or agents associated with a particular LOB. Similarly, search-designated date and/or time 211b allows the user to view entries on live feed log-in display 201 for calls and/or agents made during a particular time period. In embodiments of the invention, the user may search and sort all agent login entries according to one (or more) category/categories that appear on live feed log-in display 201. Still further, once applied, it may be desirable to indicate or otherwise display the search filter used.

It may be desirable to a business to understand the volume of TTY calls being made on a periodic basis. It may also be desirable to be able to view calls trends in real time, particularly for a large and/or high-volume call center. Those skilled in the art will understand that various embodiments of the present invention described herein may be used additionally or alternatively with FIG. 3, which shows an exemplary real-time display of TTY call trends.

Figure 3:
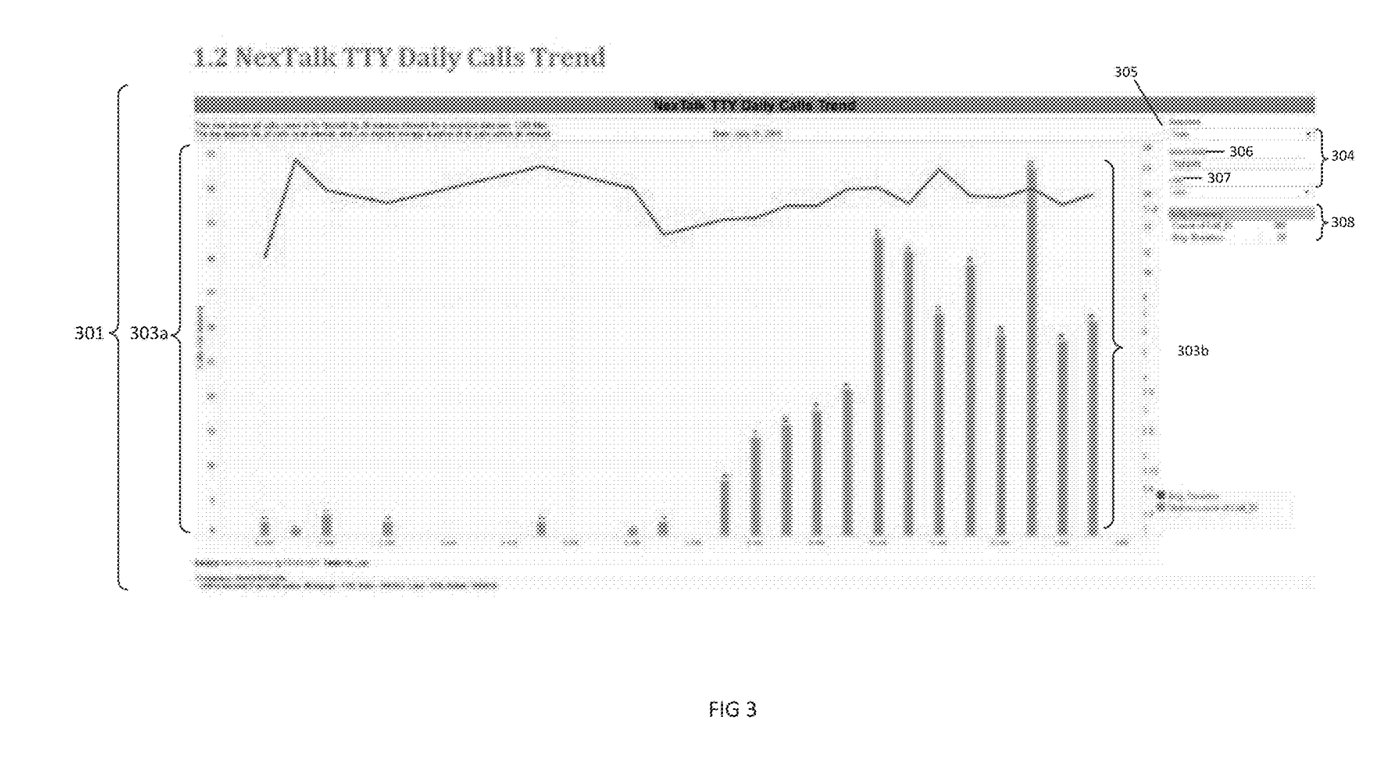
FIG. 3 is a diagram showing an exemplary real-time display of TTY call trends, in accordance with an embodiment of the invention.

Daily calls trend display 301 shows a real-time display of TTY calls being made to a TTY phone number and/or multiple TTY phone numbers associated with, e.g., a single organization. FIG. 3 shows a total count of calls in bar chart within a specified time interval (e.g., by the half hour) along y-axis A (303a) and x-axis 302. The average duration of the calls within the same interval is represented by the line graph along y-axis B (303b) and x-axis 302. In embodiments of the invention, daily calls trend display 301 may default to the current date. Those skilled in the art will also appreciate that daily calls trend display 301 may be displayed in real time. Still further, this data may be displayed in a different form (e.g., through text, tables, and/or any other representation), or in any other manner which may be desirable according to the preferences and/or needs of an organization. Additionally or alternatively, daily calls trend display 301 may comprise, for instance, a tool tip option which displays relevant data (e.g., date, time, exact duration, exact number of calls, etc.) when the user hovers a mouse or other input device over the bar graph on the display.

Daily calls trend display 301 may further comprise date selection tool 304. Using the date selection tool, a user may display data for today's date using Selection drop-down menu 305 and/or select a date by choosing "Select Date" menu 306. In embodiments of the invention, "Select Date" menu 306 may further give the user the option to select a date range. Similarly, LOB drop-down menu 307 allows the data to be filtered according to TTY calls conducted by a particular line of business. Based on the filter option, the daily calls trend display is refreshed shows data for the date/dates selected. Additional search filters may be added or substituted for the exemplary embodiment shown and described in FIG. 3.

Additionally or alternatively, daily calls trend display 301 may comprise a live daily summary feed 308. Live daily summary feed 308 may use the underlying data from calls trend display 301 to, for instance, calculate and display the total number of calls made within a specified amount of time (e.g., within the past 24 hours, since 12:01 a.m., etc.) and/or the average duration of all calls. Additional summary metrics be added or substituted for the exemplary live daily summary feed 308 shown and described in FIG. 3. Similarly, those summary metrics may, in an embodiment of the invention, be displayed for a specified time period.

Although this exemplary embodiment shows a daily trend of calls, those skilled in the art will also appreciate that the display may be customized to show this or other data along y-axis A (303a), y-axis B (303b), and x-axis 302. For instance, a call trends display may be generated for any appropriate and/or desirable time period (hourly, daily, weekly, monthly, annually). Embodiments of the invention may also allow for a custom time period (e.g., twelve days, three weeks, etc.) or for custom dates (e.g., the first week of every month, Jul. 1, 2016-Jul. 5, 2016, etc.). Similarly, call duration as demarcated along y-axis B (303b) may be displayed in minutes, seconds, or in any other time interval which may be appropriate or desirable.

In these and other embodiments of the invention, it may also be desirable to maintain live or real-time information on the accuracy and/or success of incoming TTY calls being made to an organization (TTY Events). To this end, FIG. 4. shows and describes an exemplary user interface TTY events dashboard. In this and other embodiments, a system user may view Events Dashboard 401 on the user interface of a user device such as, for instance, a desktop computer, laptop computer, mobile phone, and/or tablet device. Those skilled in the art will appreciate that other user devices with a user interface may be deployed within the bounds of this system as well. A TTY Event may be classified under a number of different user-defined categories, and those skilled in the art will also appreciate that events may be classified automatically and/or manually. TTY Events may be represented on Events Dashboard for 401 over the course of any time period (e.g., hourly, daily, monthly, weekly, annually, lifetime, etc.) that may be appropriate or desirable.

Figure 4:
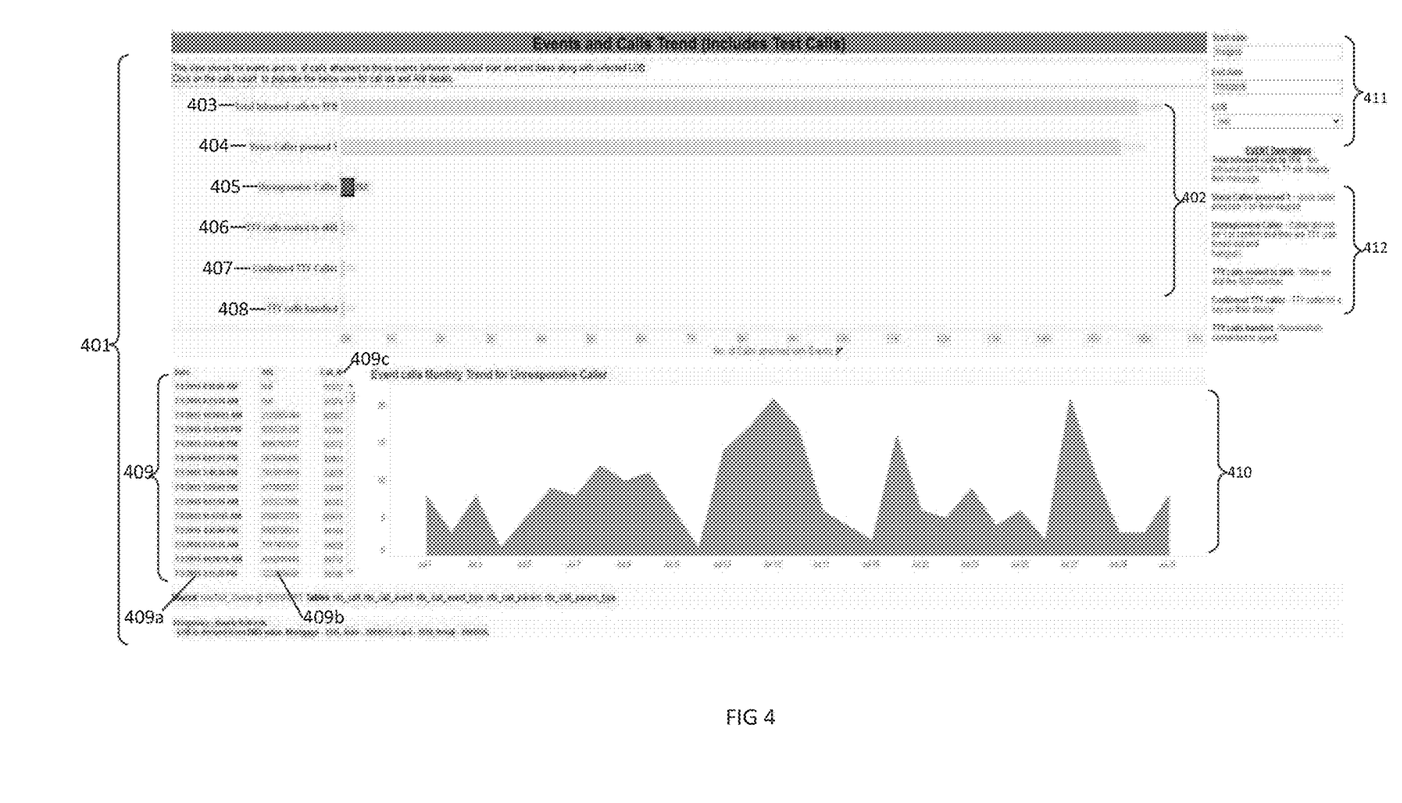
FIG. 4 is a diagram of an exemplary user interface TTY events dashboard, in accordance with an embodiment of the invention.

Events Dashboard 401 may comprise category summary window 402, which displays the designated TTY Events, as well as the total number of occurrences for each event. For example, category summary window 402 may display the Total Inbound Calls 403 made to the specified TTY phone number/phone numbers. In embodiments of the invention, Total Inbound Calls 403 will appear at the top of Events Dashboard 401, followed by additional categories and/or subcategories. For instance, Voice Caller 404 may refer to the situation in which a hearing-enabled customer accidentally dials the TTY number. If, as described herein, the system is configured in such a way that an automated audio message immediately plays requesting that the customer take a specific action, the hearing-enabled customer will hear the message and push the button, which will cause the call to be redirected through the non-TTY system. However, it may be desirable for the system to document these incoming calls to, for instance, track peak times for such mistaken calls.

Unresponsive Caller 405 may refer to a situation where it is unclear whether the caller is a TTY caller or not because there is no audible and/or TTY-based response from the caller. TTY Calls Routed 406 may refer to a situation where the call center manually routes a TTY call to the TTY number. A Confirmed TTY Caller 407 may be assessed simply by detecting and acknowledging that the caller has pushed a button on their TTY device. TTY Calls 408 may refer to TTY calls that have been successfully connected with an agent. Those skilled in the art may appreciate that further designations, categories, and/or subcategories may be appropriate or desirable. For instance, a subcategory may be added under TTY Calls 408 for calls which are successfully routed to an agent, but which are ended prematurely by malfunctioning equipment (which may further be broken down by, e.g., caller malfunction and/or agent malfunction). In embodiments of the invention, this may be illustrated on the user interface through the use of, e.g., a drill-down menu.

This data may be used, for instance, in assessing whether (and if so, where) TTY calls may be lost during processing. For example, knowing that there were eighty-six Confirmed TTY Callers 407, but only seventy-four of them were successful TTY Calls 408 that were connected to an agent, informs the user that twelve calls were disconnected and/or lost between these two steps.

Embodiments of the invention may further comprise a window and/or display, made accessible by e.g., selecting an option from a menu, which shows only data for true TTY callers, ignoring, for instance, calls from test and 1-800 numbers. In other embodiments of the invention, this information may be included and/or displayed separately. This streamlined information may further designate categories and/or subcategories (for instance, by LOB) through, e.g., color coding or any other manner.

Events Dashboard 401 may further comprise, in various embodiments, live input feed 409. Live input feed 409 may display, for instance, real-time information about incoming calls such as the date/time 409*a*, Automated Number Identification ("ANI") of the customer 409*b*, a call identification number 409*c*, which may be assigned by the system, and/or any other information which might be appropriate or desirable. In embodiments of the invention, live input feed 409 may appear in a separate window and/or in a pop-up window that can be minimized, manually or automatically or both, by a user.

Still further, Events Dashboard 401 may further comprise graphical display window 410. In embodiments of the invention, graphical display window 410 would allow the user to select one or more categories and/or subcategories for TTY Events and display data relating to that one or more categories/subcategories in the form of a graph. For example, graphical display window 410 illustrates the monthly trend of TTY calls with an Unresponsive Caller 405 during July 2015. It will be appreciated by those skilled in the art that many types of graphs and/or pictorial displays of data may be used, and that any number of parameters for displaying the data graphically may be employed. Embodiments of the invention further allow for Events Dashboard 401 to highlight and/or emphasize the one or more categories/subcategories being displayed in the graphical display window, as is shown at Unresponsive Caller 405.

Events Dashboard 401 may further comprise search filters 411, which allow the user to search and sort all TTY Events according to one (or more) category/categories. The selected filters designated in search filters 410 may be applied to, e.g., category summary window 402, Live input feed 409, graphical display window 410, and/or any other appropriate or desirable portion of Events Dashboard 401. Once applied, it may be desirable to indicate the search filter used on search filter 411. Additionally or alternatively, Events Dashboard 401 may also comprise Event Description Key 412, which offers additional information on meaning to the categories listed within category summary window 402.

In embodiments of the invention, it may be desirable, additionally or alternatively, to display a list and/or live feed of redialed calls on Events Dashboard 401. This would allow for identification of calls received by the system more than one time and subsequent identification of why the user is redialing the TTY number (e.g., TTY system malfunction, user error, operator error, etc.). Such display may identify repeat callers by, for example, ANI and/or a caller identification code and/or a phone number associated with the customer TTY device. Further, those skilled in the art will appreciate that it may be desirable to implement such an embodiment in conjunction with the exemplary display shown in FIG. 1, in order to determine how redialed calls may be redirected to the same operator.

In embodiments of the invention, it may be desirable, additionally or alternatively, to display data associated with port capacity utilization on Events Dashboard 401. This data may indicate, for instance, the percentage utilization based on the total number of received TTY calls. In embodiments of the invention, it may also be desirable or advantageous to display this data in a weekly or monthly summary. Additionally or alternatively, any image, graph and/or representation of such data may include a feature allowing the user to hover the user device (e.g., the mouse pointer) on the image to display additional details about a specific data point.

Those skilled in the art will further appreciate that it may be desirable for Events Dashboard 401 to display alerts upon the occurrence of a pre-specified event. An alert may be in the form of, e.g., a pop-up window or any other notification device that may be applicable to the user system. Such alerts may be tailored to a particular user; additionally or alternatively, they may be system-wide.

Those skilled in the art will appreciate that various configurations of Events Dashboard 401, as well as of the features and components described therein, are illustrative and shown by way of example only. There are numerous manners in which the relevant data may be arranged and displayed, particularly with regard to the real-time feed discussed herein.

Figure 5:
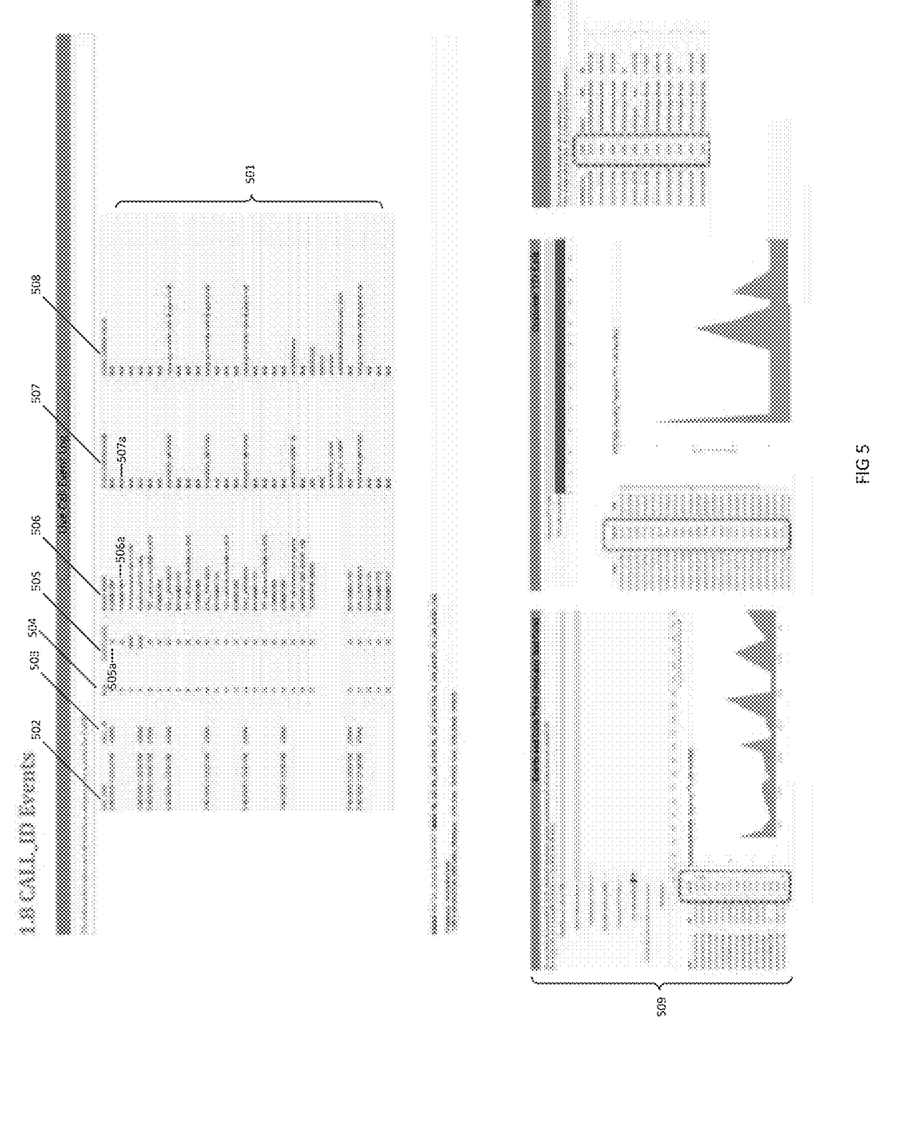
FIG. 5 is a diagram of an exemplary display of a real-time feed of Call Event Log, in accordance with an embodiment of the invention.

In embodiments of the invention, it may be desirable to generate and display a real-time feed of a single call, detailed in the form of a live Call Event Log, as shown and described in exemplary FIG. 5. In embodiments of the invention, live Call Event Log 501 may be viewable in conjunction with another live feed such as, e.g., exemplary FIG. 4, which includes live input feed 409 displaying information by, e.g., ANI 409*b* and/or a call identification number 409*c*. In embodiments of the invention, call identification number 409*c* will be selectable by a user device, and selection of a specific call identification number will cause the live Call Event Log 501 to display in a new window. Additionally or alternatively, the live Call Event Log 501 will be automatically populated by certain data associated with a particular call identification number 409*c*.

Live Call Event Log 501 may, in embodiments of the invention, show or display information relating to a selected call identification number in real time. The data included in Live Call Event 501 may include, for instance, information relating to the date/time 502, the selected call identification number 503, an assigned sequence number 504, an event code 505, event name 506, event parameter name 507, and event parameter value 508. Call identification number 503 may correspond with call identification number 409*c*. In other embodiments, it may be desirable to generate a new number for the separate interface displayed in live Call Event Log 501.

In embodiments of the invention, the date/time 502 may populate or refresh automatically within a predetermined amount of time (e.g., every 5 seconds, every 30 seconds, every 1 minute, every 3 minutes, etc.) with information associated with the selected call identification number 503. The information may also be collected and/or displayed in real time. In embodiments of the invention, information associated with date/time 502 includes hour, minute, and second information in order to best display the event details of a particular call.

In embodiments of the invention, the system may number the entries made at each date/time 502 entry with an assigned sequence number 504. Accordingly, in embodiments of the invention, sequence number 504 may simply comprise a series of sequential numbers beginning at 0 or 1 (or any other value that may be desirable). Those skilled in the art will appreciate that any numbering system may be used, and in embodiments of the invention, the assigned sequence number 504 may not be a number at all, but a letter, symbol, or other designation.

Event code 505 may show or display an alphanumeric code for each event name 506. For instance, when an operator and customer are connected on a TTY call, this event name is designated "connected" 506*a* and assigned an event code of "42" 505*a*. In embodiments of the invention, events may be named and associated with a corresponding code by a system administrator. Additionally or alternatively, it may be desirable to allow end users, such as operators, to designate such information. Event code 505, event name 506, event parameter name 507, and event parameter value 508 may determine how the date time 502 entries are displayed.

Event parameter name 507 may show or display, where appropriate, a parameter name associated with event code 505 and/or event name 506. Event parameter name 507 may be used to indicate, for example, the success or failure of the operation that generated the event and/or provide information about any error that might have occurred while the event occurred or was occurring. In embodiments of the invention, the system may display the word "Null," as shown at 507*a*, when there is no event parameter name 507 corresponding with event code 505 and/or event name 506. Event parameter value 508 may comprise an alphanumeric code and/or other information associated with event parameter name 507. Similarly, the system may display the word "Null," as shown at 508*a*, when there is no event parameter value 508 corresponding with event code 505 and/or event name 506 and/or event parameter name 507.

Those skilled in the art will appreciate that it may be desirable, additionally or alternatively, to generate and display this information for more than one call identification number 503. Accordingly, in embodiments of the invention, live Call Event Log 501 may be customized to show or display information for more than one call at a time. Additionally or alternatively, it may be desirable to display the information available in live Call Event Log 501 by a particular column in order to, e.g., determine how frequently a certain event code 505 appears. In embodiments of the invention, for instance, where a user is generating live feeds involving separate universes of calls (e.g., true TTY calls and mistaken TTY calls), it may also be desirable to generate live Call Event Log 501 based upon lists of caller identification numbers from both of those feeds.

Those skilled in the art will further appreciate that embodiments of the invention may also comprise graph display bar 509, which may allow the user to, e.g., view call trends and/or other live feeds as described herein, and to subsequently select a specific call for review using Call Event Log 501.

It may be desirable or advantageous, in embodiments of the invention, to provide a user with options for best managing the data generated by the system as described herein. It may further be desirable or advantageous to export data received through the system as described herein. Accordingly, embodiments of the invention may comprise an export function through use of a toolbar as shown and described in exemplary FIG. 6A that may be deployed in conjunction with, e.g., the data from a live feed and/or a data set generated through the search functionalities described herein. Exemplary FIG. 6A may comprise toolbar 601. In embodiments of the invention, toolbar 601 may comprise options designated by, e.g., words, shapes, abbreviation, numbers, and the like. For instance, toolbar option 601*a* may be selected if the user wishes to export certain and/or selected data from the system. Toolbar option 601*b* may be selected if the user wishes to revert from application of a filter and/or other search functionality (for instance, if the user searched for data within a certain date range, but wishes to revert to the live feed after doing so). Toolbar option 601*c* may be used to stop automatic updates to a report. This may be particularly applicable when the user is applying multiple filters. In embodiments of the invention, the user could stop an automatic refresh, apply the desired filters, and refresh a live feed to display it with the selected filter options. Toolbar option 601*d* may be selected to manually refresh a live feed with recent data, if for some reason the data has not automatically updated.

Figure 6A:
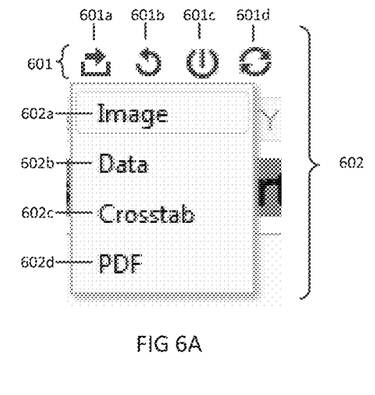
FIG. 6A is a diagram illustrating an exemplary user toolbar, in accordance with an embodiment of the invention.

Embodiments of the invention may further comprise drop-down menu 602. In embodiments of the invention, clicking on toolbar option 601*a*, which may be selected if the user wishes to export certain and/or selected data from the system, will cause drop-down menu 602 to display. Additionally or alternatively, the user may be required to click on and/or otherwise specify drop-down menu 602 through another pathway. Drop-down menu 602 may display sub-options using, e.g., words, shapes, abbreviations, numbers, and the like. For instance, the sub-options that appear under drop-down menu 602 may include sub-option Image 602*a*, sub-option Data 602*b*, sub-option Crosstab 602*c*, and sub-option PDF 602*d*. In embodiments of the invention, selection of sub-option Image 602*a* may allow the user to save their current view on the system as an image (e.g., a .jpeg, .bmp, .tiff, etc.). Additionally or alternatively, selection of this sub-option may prompt a new window to open allowing the user to download the image to a selected drive and/or to save it in a selected file format. Selection of sub-option Data 602*b* may allow the user to extract selected data elements from the system and save it as a text file. Additionally or alternatively, selection of this sub-option may prompt a new window to open allowing the user to download the text file to a selected drive and/or to save it in a selected file format. Selection of sub-option Crosstab 602*c* may further allow the user to extract selected data elements from the system as a preferred file format (e.g., as a Microsoft Excel® spreadsheet), and sub-option PDF 602*d* may allow the user to extract selected data elements from the system and save them as an Adobe® PDF. Those skilled in the art will appreciate that any number of sub-options may be provided for under any number of toolbar options in various embodiments of the invention, depending on what may be desirable and advantageous to the user.

Figure 6B:
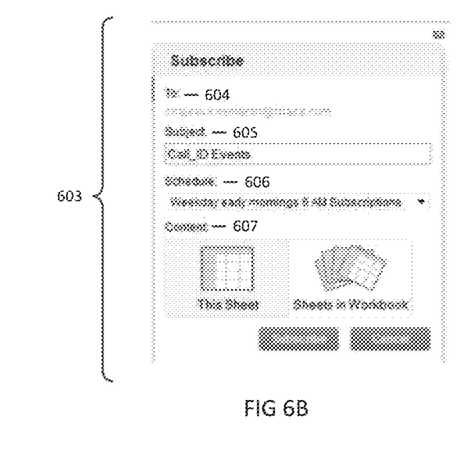
FIG. 6B is a diagram illustrating an exemplary user subscription interface, in accordance with an embodiment of the invention.

In embodiments of the invention, it may further be desirable to allow a user to subscribe to certain data feeds, as shown and described in the exemplary user subscription interface in FIG. 6B.

Exemplary user subscription interface may include user subscription display 603, with data input fields for user e-mail address input 604, subject input 605, schedule input 606, and content input 607. In embodiments of the invention, this option may be available around or near toolbar 601. User subscription display 603 may allow users to set up the subscribe option to their e-mail, for instance, through Microsoft Outlook®. In embodiments of the invention, the user may be presented with user subscription display 603 if the user wishes to receive regular updates of a particular data set generated by the system. For example, e-mail address input 604 may correspond with the user's e-mail address. In embodiments of the invention, it will be appreciated by those skilled in the art that e-mail address input 604 may correspond to multiple e-mail addresses, including, for example, one or more distribution lists. Subject input 605 may refer to the user's own preferred title of the subject of the data being subscribed to. Schedule input 606 may refer to the time at which the updates will be sent and/or received. Content input 607 may refer to the subject matter of the requested data. In embodiments of the invention, for example, user subscription display 603 may request that the user indicate which data should be exported. Further, in embodiments of the invention, mail address input 604, subject input 605, schedule input 606, and content input 607 may all initially be presented on user subscription display 603 with default and/or suggested inputs.

Embodiments of the invention also allow the subscription functionality, available through user subscription display 603, to be made available through other embodiments of the invention described herein, such as, e.g., Events Dashboard 401. Those skilled in the art will also appreciate that embodiments of the invention may further allow for various permissions settings which are required to access the features and functionalities described with regard to FIGS. 6A and 6B.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC ("Consumer Specific Integrated Circuit") or ASIC ("Application Specific Integrated Circuit") or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A computer-implemented system for routing and managing Text Telephone (TTY) calls, the system comprising:
   at least one storage medium storing instructions, the at least one storage medium coupled to at least one computer processor configured to access the stored instructions to:
   determine that a first telephone call to a TTY phone number is a confirmed TTY call made from a TTY device;
   determine that a second telephone call to the TTY phone number is a mistaken TTY call that is not a confirmed TTY call;
   route the confirmed TTY call to a TTY operator, wherein the TTY operator is associated with an operator user device;
   generate a live input feed of the confirmed TTY call on the operator user device, the live input feed including a call event log identifying the confirmed TTY call and the mistaken TTY call;
   display the live input feed on a user interface associated with the operator user device; and
   record receipt of the confirmed TTY call and of the mistaken TTY call in a database comprising data associated with at least one other TTY call.

2. The system of claim 1, wherein the at least one computer processor is further configured to:

generate at least one sub-set of data based on user input; and display the at least one sub-set of data on the user interface.

3. The system of claim 2, wherein the at least one sub-set of data comprises data associated with at least one of the following: total number of calls received; operator activity; daily call trends; weekly call trends; monthly call trends; annual call trends; or call events.

4. The system of claim 2, wherein the user input is based on a selected date.

5. The system of claim 2, wherein the user input is based on a selected Line of Business (LOB).

6. The system of claim 5, wherein a user may subscribe to a report issued at regular intervals, and wherein the report is based at least in part on the at least one extracted sub-set of data.

7. The system of claim 5, wherein the at least one computer processor is further configured to:
extrapolate at least one data trend from the at least one sub-set of data.

8. The system of claim 2, wherein the at least one computer processor is further configured to:
extract the at least one sub-set of data into a spreadsheet.

9. The system of claim 1, wherein the TTY call is assigned a unique call identification number.

10. The system of claim 1, wherein the at least one other TTY call is a call that was routed to a second operator.

11. A computer-implemented method for routing and managing Text Telephone (TTY) calls, the method comprising:
storing instructions in a computer memory coupled to at least one computer processor;
receiving a first telephone call and a second telephone call to a TTY phone number;
determining that the first telephone call to the TTY phone number is a confirmed TTY call made from a TTY device;
determining that the second telephone call to the TTY phone number is a mistaken TTY call that is not a confirmed TTY call;
routing the confirmed TTY call to a TTY operator, wherein the TTY operator is associated with an operator user device;
accessing the stored instructions by the at least one computer processor;
executing the stored instructions to generate a live input feed of the confirmed TTY call on the operator user device, the live input feed including a call event log identifying the confirmed TTY call and the mistaken TTY call;
displaying the live input feed on a user interface associated with the operator user device; and
recording receipt of the confirmed TTY call and of the mistaken TTY call in a database comprising data associated with at least one other TTY call.

12. The method of claim 11, wherein the live input feed comprises data associated with the operator.

13. The method of claim 12, wherein the data associated with the operator comprises at least one of the following: a user name; an associated LOB; a log-in date; a log-in time; a log-out date; or a log-out time.

14. The method of claim 11, further comprising:
generating at least one sub-set of data based on user input; and
displaying the at least one sub-set of data on the user interface, wherein the at least one sub-set of data comprises data associated with at least one of the following: total number of calls received, operator activity, daily call trends, weekly call trends, monthly call trends, annual call trends, and/or call events.

15. The method of claim 14, further comprising applying at least one search filter to the at least one sub-set of data.

16. The method of claim 14, further comprising generating a graphical representation of the at least one sub-set of data.

17. The method of claim 16, wherein the graphical representation shows trends in call volume on a regular interval.

18. The method of claim 17, wherein the regular interval is one of the following intervals: daily, weekly, monthly, or annually.

19. A computer-implemented system for routing and managing Text Telephone (TTY) calls, the system comprising:
at least one storage medium storing instructions, the at least one storage medium coupled to at least one computer processor configured to access the stored instructions to:
determine that a first telephone call to the TTY phone number is a confirmed TTY call made from a TTY device;
determine that a second telephone call to the TTY phone number is a mistaken TTY call that is not a confirmed TTY call;
route the confirmed TTY call to a TTY operator, wherein the TTY operator is associated with an operator user device;
generate a live input feed of the confirmed TTY call on the operator user device, the live input feed including a call event log identifying the confirmed TTY call and the mistaken TTY call;
assign an event code and corresponding event name to at least one event on the confirmed TTY call;
display the event code and corresponding event name on the live input feed, wherein the event code and corresponding event name are associated with a specific date and time;
display the live input feed on a user interface associated with the operator user device; and
record receipt of the confirmed TTY call and of the mistaken TTY call in a database.

* * * * *